(12) United States Patent
Young, Sr.

(10) Patent No.: US 6,644,719 B2
(45) Date of Patent: *Nov. 11, 2003

(54) SLIDABLE ROOM ASSEMBLY

(75) Inventor: James Young, Sr., Toluca, IL (US)

(73) Assignee: Norco Industries, Inc., Compton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/897,762

(22) Filed: Jul. 2, 2001

(65) Prior Publication Data

US 2002/0063441 A1 May 30, 2002

Related U.S. Application Data

(63) Continuation of application No. 09/296,357, filed on Apr. 22, 1999, now Pat. No. 6,254,171.

(51) Int. Cl.⁷ .............................................. B60R 27/00
(52) U.S. Cl. ................................... 296/165; 296/26.13
(58) Field of Search ........................ 296/26.13, 26.12, 296/26.08, 26.09, 26.04, 26.05, 165, 171, 175, 172; 52/67, 143

(56) References Cited

U.S. PATENT DOCUMENTS

| 1,972,415 A | 9/1934 | Anderson |
|---|---|---|
| 2,739,833 A | 3/1956 | Schenkel et al. |
| 2,744,781 A | 5/1956 | Black |
| 2,857,197 A | 10/1958 | Hogg |
| 2,877,509 A | 3/1959 | Klibanow |
| 2,898,143 A | 8/1959 | Ferrera |
| 2,898,144 A | 8/1959 | Ferrera |
| 2,902,312 A | 9/1959 | Ferrera |
| 2,987,342 A | 6/1961 | Meaker et al. |
| 3,341,986 A | 9/1967 | Brosig |
| 4,103,462 A | 8/1978 | Freller |
| 4,270,791 A | 6/1981 | Tann |
| 5,090,749 A | 2/1992 | Lee |
| 5,237,782 A | 8/1993 | Cooper |
| 5,248,180 A | 9/1993 | Hussaini |
| 5,295,430 A | 3/1994 | Dewald, Jr. et al. |
| 5,332,276 A | 7/1994 | Blodgett, Jr. |
| 5,634,683 A | 6/1997 | Young |
| 6,254,171 B1 * | 7/2001 | Young, Sr. .................. 296/165 |

FOREIGN PATENT DOCUMENTS

| BE | 523151 | 10/1953 |
|---|---|---|
| CA | 2136673 | 3/1996 |
| DE | 1 095 137 B | 12/1960 |
| GB | 882258 | 11/1961 |

* cited by examiner

Primary Examiner—Joseph D. Pape
(74) Attorney, Agent, or Firm—Hahn, Loeser & Parks, LLP; Michael H. Minns, Esq.

(57) ABSTRACT

A slidable room assembly comprises a vehicle body having an opening formed in an exterior wall, and a reciprocable slideout unit or compartment disposed in the opening and slidable between a retracted position and an extended position. Sliding movement of the slideout unit is controlled by means of a drive mechanism which includes either one or two endless cables. A plurality of sheaves, rotatably mounted on the slideout unit, define a path for the endless cable or cables. This path includes a pair of parallel longitudinally extending courses disposed on opposite sides of the slideout unit. Anchors, attached to respective longitudinally extending courses of the cable(s) and to adjacent portions of the vehicle body, effect relative reciprocation between the slideout unit and the vehicle body. Sliding movement of the slideout unit may be either motor driven or manually powered.

25 Claims, 12 Drawing Sheets

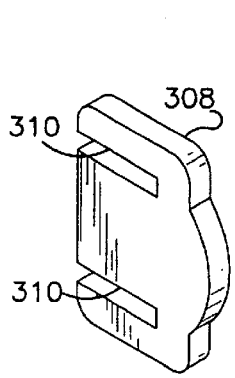
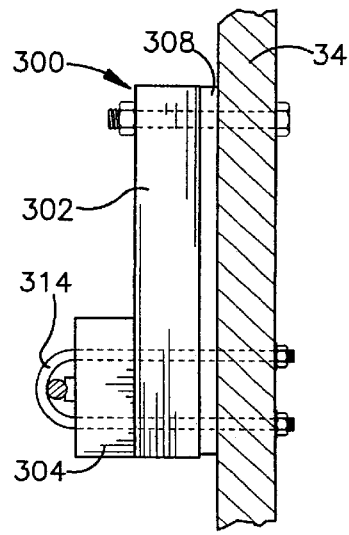
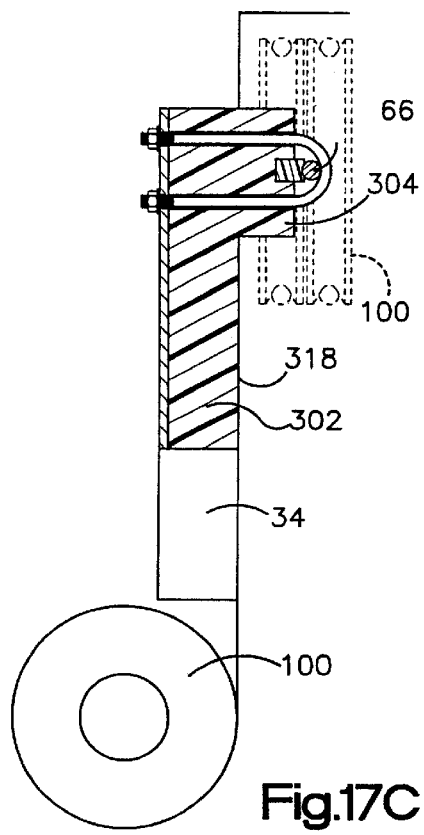
Fig.17A
Fig.17B
Fig.17C
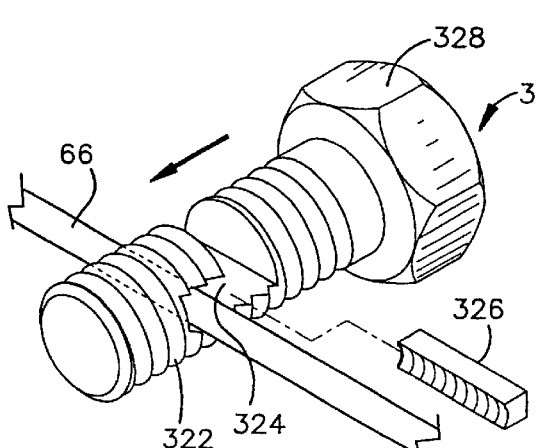
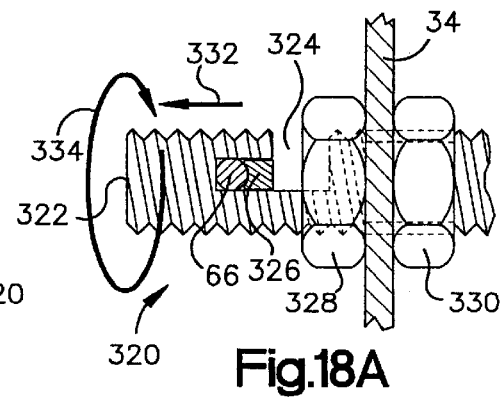
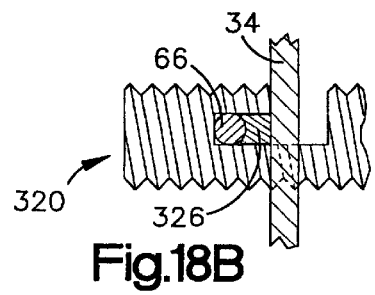
Fig.18
Fig.18A
Fig.18B

SLIDABLE ROOM ASSEMBLY

This application is a continuation of prior application Ser. No. 09/296,357, filed Apr. 22, 1999, now U.S. Pat. No. 6,254,171. Application Ser. No. 09/296,357, is hereby incorporated by reference.

FIELD OF THE INVENTION

This invention relates to a slidable room assembly, particularly to a slidable room assembly for a vehicle having a slideout room or compartment which is retracted when the vehicle is in motion and may be extended to afford more room when the vehicle is parked. More particularly, this invention relates to a slidable room assembly which includes an improved mechanism for, closing sliding or reciprocation of the slideout unit relative to the vehicle.

BACKGROUND OF THE INVENTION

Recreation vehicles including motor homes and travel trailers may be provided with an extensible slideout unit for increasing the vehicle's living space. This slideout unit may be extended for use when the vehicle is parked and is retracted in a telescoping manner when the vehicle is to be moved.

Prior vehicle slideout installations which include an extension/retraction system that relies on screws or a pinion for effecting telescoping movement of the slideout unit relative to the vehicle are known. Screws, in particular, must be short for practical reasons, including the tendency of a longer screw to deflect so that the axis of the screw is not absolutely straight. This, of course, greatly impairs operability of the screw. Pinions must also be comparatively short for practical reasons, including excessive weight in a pinion of greater length. Since the amplitude of movement of the slideout room or compartment can be no greater than the length of the screw or pinion, the amplitude of sliding movement, and hence the amount of additional space gained by the slideout compartment, is limited.

Other types of slideout installations for vehicles are also known. One such installation employs an endless cable which passes over one pair of pulleys supported by a main part of a mobile home and a second pair of pulleys mounted on side walls of an extension part of the mobile home to cause the extension part to reciprocate. Another slideout installation shows an expanding caravan which also includes a rotatable shaft and two types of cables wound therearound. Rotation of the shaft in one direction causes one type of cable to wind as the other type unwinds, causing a second module to reciprocate in one direction (say outwardly) relative to first module. Rotation of the shaft in the opposite direction causes the second module to move in the opposite direction (say inwardly relative to the first module).

Presently known room slideout units have various problems.

A major problem is that a slideout room is cantilevered as it is extended. The outer end of the extended slideout room tends to tip downwardly. This puts weight on the slideout unit's operating mechanism. The cantilevered slideout room also tends to be loose at the top and tight at the bottom. This puts weight on the slideout mechanism, which in turn impairs slideability and also invites leakage.

Another problem with presently known slideout un its is that they require modification of the vehicle's underframe, unless the slideout unit is of small size. For example, it may be necessary to cut away a portion of the underframe in order to accommodate the operating mechanism of the slideout unit. This impairs the ability of the underframe to support the vehicle by lessening the strength and rigidity of the underframe.

SUMMARY AND OBJECTS OF THE INVENTION

It is an object of this invention to provide a vehicle slideout assembly which permits greater amplitude of movement of a slideout unit than is obtainable with presently known slideout arrangements.

Another object of this invention is to provide a slideable room assembly which permits greater design flexibility and a slideout room of larger size than is possible in presently known slideable room assemblies.

It is a further object of this invention to provide a vehicle slideout assembly which does not rely on either screws or pinions to achieve relative movement between a slideout unit and a vehicle on which the slideout unit is mounted.

A still further object of this invention is to provide a vehicle slideout assembly which includes a drive mechanism which may be mounted on either a slideout unit or a vehicle body and which directly grips the other in order to accomplish relative movement between the two.

According to this invention, a vehicle is provided with one or more horizontally reciprocable slideout units. Slideout units according to this invention include one or more room slideout units and/or one or more storage slideout units (or compartments). A vehicle may have either type, or both types, of slideout units, and may have one or more slideout units of each type.

The vehicle comprises a vehicle body having a plurality of exterior walls, at least one of which has an opening therein. Each slideout unit is disposed in a vehicle body opening and is slidable between an extended position and a retracted position. The vehicle body and a slideout unit form respective first and second relatively reciprocable modules. The drive mechanism is supported by one of the modules (preferably the slideout unit) and comprises at least one flexible drive member and a plurality of (preferably four) attachment members or anchors for securing the drive member (or members) to the other module (-preferably the vehicle body). The drive mechanism further comprises a series of freely rotating guide members and means for alternately pulling the drive member(s) in opposite directions across the guide members to reciprocate the slideout unit.

Either one or more drive members are provided. The cable drive member(s) may be pulled wither by a power unit (e.g., a motor), or manually.

The drive member should remain taut and is therefore made of high modulus material. An endless cable is the preferred drive member. The guide members guide the drive member(s) in a predetermined path. Ordinarily, the guide members rotate about fixed axes. Sheaves are preferred guide members.

Pulling of the cable drive member(s) in one direction reciprocates the slideout unit in one direction, e.g., toward the extended position. Pulling of the cable drive member(s) in the opposite direction reciprocates the slideout unit in the opposite direction, e.g., toward the retracted position.

BRIEF DESCRIPTION OF THE DRAWINGS

This invention will now be described with particular reference to the accompanying drawings, in which:

FIGS. 8A and 18B are diagrammatic perspective view of the drive mechanism shown in FIG. 7, showing the drive mechanism in a second or slideout extended position.

FIG. 17A is a perspective view of a shim plate useful with the anchor of FIG. 17.

FIG. 17B is a diagrammatic side elevational view of the anchor of FIG. 17 secured to a frame member.

FIG. 17C is a fragmentary side elevational view of an installation comprising the anchor of FIG. 17.

FIG. 18 is a perspective view of an anchor according to a further embodiment of this invention.

FIGS. 18A and 18B are diagrammatic side elevational views of an installation comprising the anchor of FIG. 18A.

DESCRIPTION OF THE PREFERRED EMBODIMENTS

This invention will now be described in detail with particular reference to preferred embodiments, including the best mode and preferred embodiment of the invention.

Figure 1:
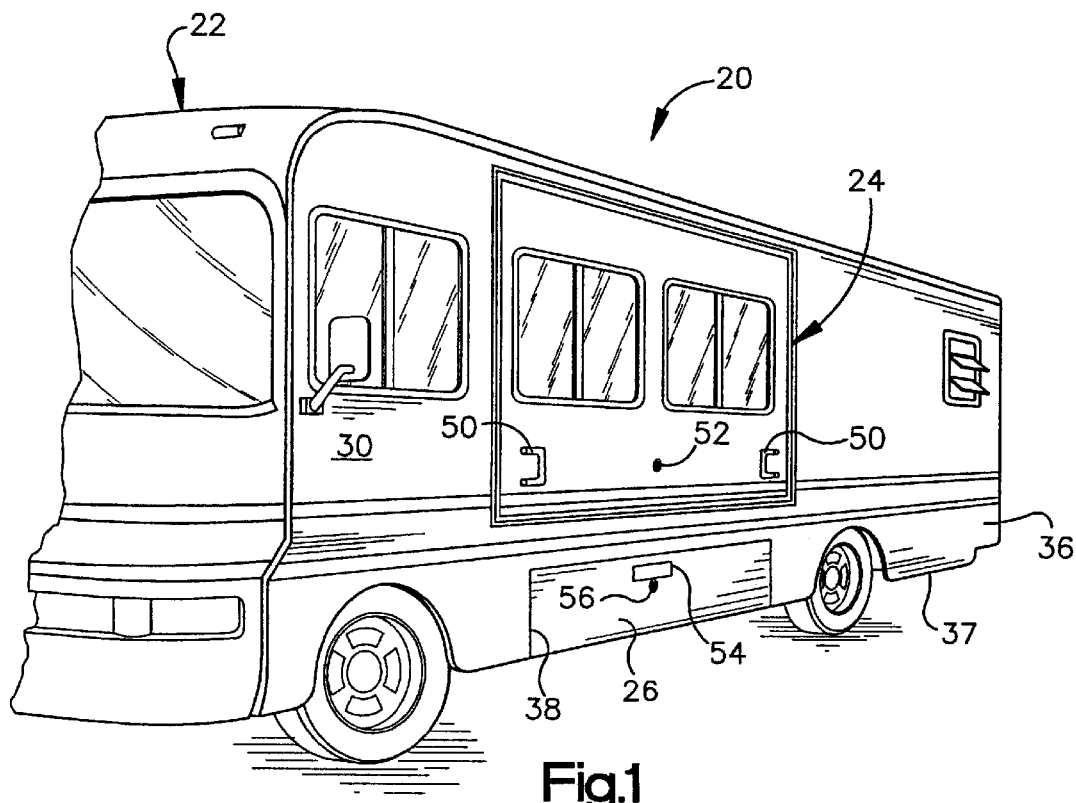
FIG. 1 is a partial perspective view of a recreational vehicle incorporating slideout units in accordance with the present invention, illustrating the slideout units in the retracted position.
Figure 2:
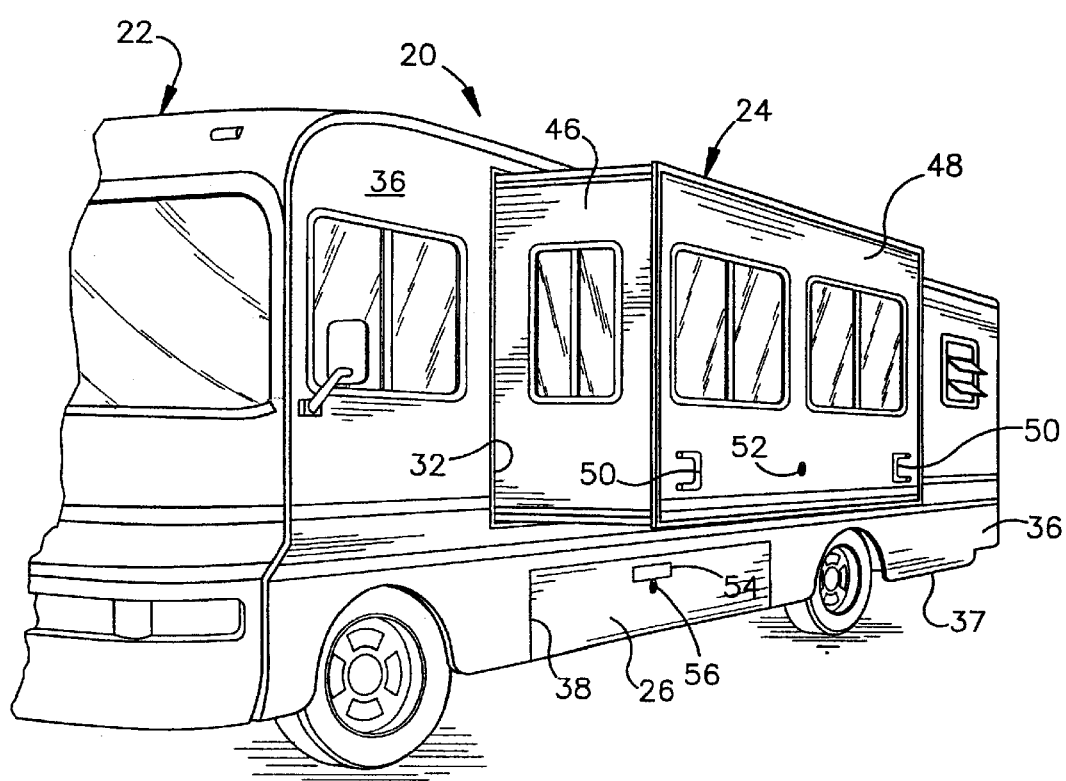
FIG. 2 is a perspective view of a recreational vehicle incorporating slideout units in accordance with the present invention, illustrating a slideout unit which forms a room extension in the extended position.
Figure 3:
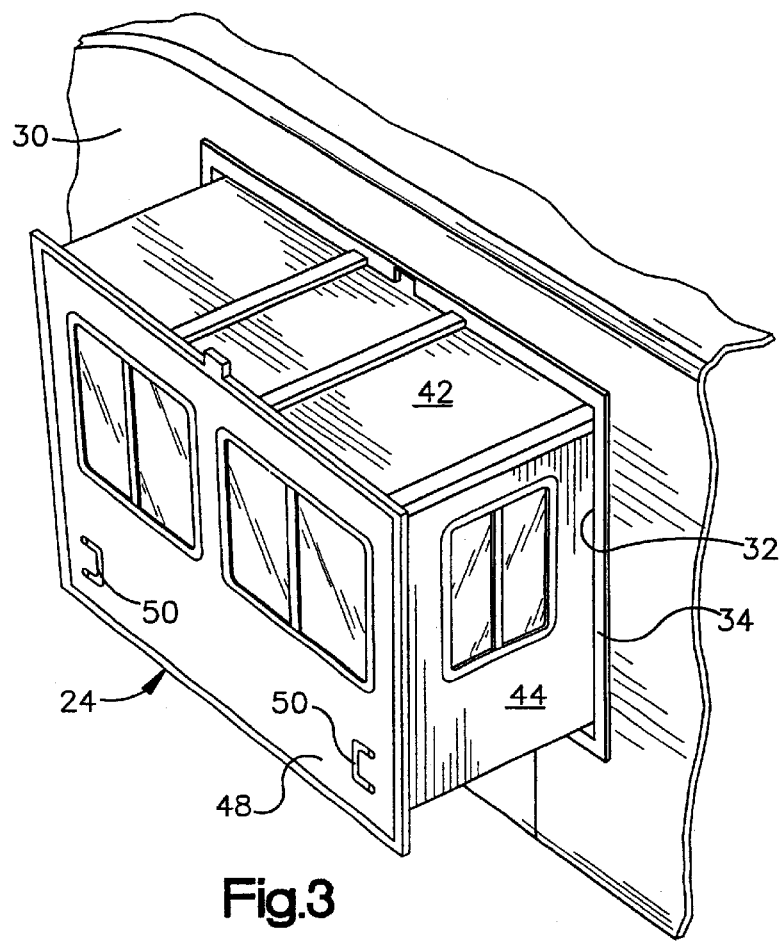
FIG. 3 is an upper partial perspective view of a recreational vehicle incorporating a slideout unit in accordance with the present invention, wherein a slideout unit forming a room extension is illustrated in the extended position.

Referring now to FIGS. 1–3, the present invention in its preferred embodiments relates to a vehicle 20 comprising a vehicle body 22 (or base unit or first module) having one or more room slideout units (or second modules) 24 which is horizontally reciprocable relative to the vehicle body 22 between a retracted (or first) position shown in FIG. 1 and an extended (or second) position shown in FIGS. 2 and 3. The slideout unit 24, when extended, affords more room or space to the interior of the vehicle. A novel actuation system or drive mechanism (or force transmitting mechanism), to be described later is provided for reciprocation of the slideout unit 24. This first slideout unit (room slideout unit or space-expanding slideout unit) 24, and the drive mechanism for reciprocating the slideout unit 24, together form a slidable room assembly.

The vehicle 20 may alternatively or further comprise one or more reciprocable storage slideout units 26, which may serve as storage compartments. This second or storage slideout unit 26, show in closed (or retracted) position in FIGS. 1 and 2, may be disposed in a lower portion of a side wall of vehicle body 22. This storage slideout unit 26 will be described in greater detail subsequently with reference to FIG. 4. The actuating system or drive mechanism for reciprocating the storage slideout unit 26 may be similar to that used to reciprocate room slideout unit 24, but may be smaller and less powerful (since a storage slideout unit 26 is much lighter than a room slideout unit 24) and is preferably positioned differently, as will be described subsequently.

A vehicle 20 may have either one or more room slideout units 24, or one or more storage slideout units 26, or both. Thus, a vehicle 20 may have one or two storage slideout units 26 but no room slideout unit 24 if desired. Also, a vehicle may have either one or two room slideout units 24 but no storage slideout unit 26 if desired.

The vehicle 20 may be a self-powered vehicle, such as a recreational vehicle, or may be a trailer which is adapted to be towed, e.g., by an automobile or a truck tractor. The vehicle may be one which is designed for living (as a house trailer), or may be a work vehicle (e.g., a mobile library).

In any case, a vehicle 20 according to this invention comprises a vehicle body 22 having a plurality of exterior walls, e.g., a roof, a front wall, side walls, and a rear wall. The interior of vehicle body 22 also has a floor. Beneath the floor is an underframe (not shown) for supporting the vehicle body 22, the underframe may be conventional. At least one of the exterior walls, here shown as the left side wall 30, has an opening 32 therein for receiving the first reciprocable slideout unit 24. The opening 30 in the left side 30 of vehicle body 22 is preferably rectangular, as shown, and has a perimeter which includes horizontal top and bottom edges and vertical side edges. A fixed frame member 34, which may be metallic or rigid composite in its preferred form, encircles the perimeter of the opening 32. Each of the side walls 30 (only the left side wall is shown) has a lower portion or skirt 36, which is disposed below the floor of vehicle 20 and which terminates in a lower edge 37. One or both side walls 30 may have an opening 38, which is preferably rectangular, for receiving storage slideout unit 26. There may be any number of such openings 38 equal to the number of storage slideout units 26. These openings 38 may be in any location. Opening 38 preferably extends to the lower edge 37 of the side wall 30.

Figure 4:
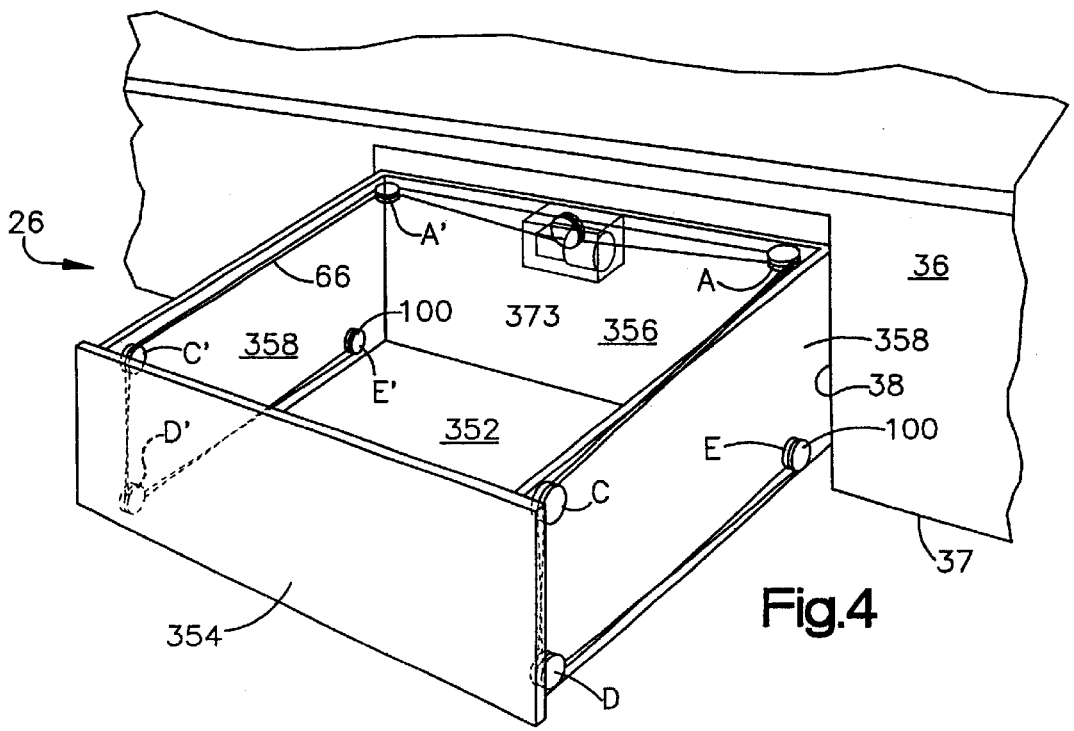
FIG. 4 is a fragmentary perspective view of a recreational vehicle in which a second slideout unit, in this case a storage compartment, is in the extended position.

Both slideout units 24 and 26 should always be retracted, as shown in FIG. 1, when the vehicle is in motion. When the vehicle is parked or stationary, the room slideout unit 24 may be slid to the extended position shown in FIGS. 2 and 3, to afford additional room in the interior of the vehicle. Similarly the storage slideout unit 26 may be opened (i.e., moved to extended position), as shown in FIG. 4, when the vehicle is at rest.

The room slideout unit 24 has the same cross-sectional shape as the opening 32 in the vehicle body 22, i.e., rectangular in the preferred embodiment shown. The slideout unit 24 may comprise a floor 40, a ceiling 42, left and right side walls 44 and 46, respectively (as seen from the interior of vehicle 20 looking out), and a forward or outside wall 48. The forward or outside wall 48 of the slideout unit 24 is substantially coincident with (and spaced slightly outwardly from) the left side wall 30 of the vehicle body 22 when the slideout unit 24 is retracted (FIG. 1), and is parallel to and spaced outwardly from the vehicle body side wall 30 when the slideout unit 24 is extended (FIG. 2). As described, the left side wall 44 of the slideout unit 24 is disposed in a rearward direction of the vehicle body 22, and the right side wall 46 of the slideout unit 24 is disposed in a forward direction of the vehicle body. The spacing between opposite side walls 44 and 46 (which are respective left and right hand walls) is just slightly less than the width of the opening 32 in the vehicle body 22, to afford enough clearance for sliding movement of the slideout unit 24 while minimizing the intrusion of the elements such as wind and rain. The size of the forward or outer wall 48 is just slightly greater than the size of the vehicle body opening 32. In this manner, the edges of the forward wall 48 overlie the fixed frame member 34 on the vehicle body 22 which is an aid in maintaining a good seal when the slideout unit is retracted. Seals (not shown) extending around the perimeter of opening 22 may be provided.

The room slideout unit 24 may be provided with windows in the forward and side walls, as shown, particularly when the vehicle is used as a recreational vehicle or house trailer.

Opening and closing movements of either the first or second; slideout units or compartments 24 and 26 can be accomplished either manually or with a power assist, as will be described later. One of the slideout units can be powered and the other (say storage slideout unit 26) can be manually operated if desired. In certain embodiments (i.e., when manual operation is desired), handles 50 may be provided on the front wall of the slideout unit 24, so that the slideout unit can be opened and closed manually. A lock 52 for room slideout unit 24 may be provided. Such lock should be provided unless the drive mechanism employs a drive (e.g., a worm drive) which locks the slideout unit 24 in position when it is at rest (whether retracted, extended or in between). Similarly, the storage slideout unit 26 may be provided with a handle 54 for manual operation, and a lock 56.

Either one or more than one space-expanding slideout unit 24 may be provided in a vehicle 20 in accordance with this invention. A horizontally reciprocable room slideout unit 24 may be provided in any of the exterior walls of vehicle 20, e.g., the left side wall 30 as shown, the right side wall, and/or the rear wall of vehicle 20. Two room slideout units 24, one on each side of the vehicle may be provided. Also in accordance with this invention, one may provide a vertically reciprocable slideout unit in order to expand interior space in a vertical direction. The drive mechanism in all cases may be as described in FIGS. 5–9.

FIGS. 5–9 show various force transmission mechanisms (or drive mechanisms) in accordance with this invention for transferring force or power from a power input source to a slideout unit. The power input source may be either manual or motorized, as will be illustrated hereinafter. In all embodiments, force is transmitted evenly to upper and lower portions and to both sides of the slideout unit, resulting in smooth, even application of force, so that the slideout unit reciprocates smoothly along its predetermined axis and in a predetermined plane, with no tendency to twist or bind, and with minimum power input required, considering the appreciable weight of a typical slideout unit for a vehicle.

The force transmission systems (or drive mechanisms) illustrated in all of the embodiments of FIGS. 5–12 are shown as on-board systems which are mounted on the slideout unit 24 so that the drive mechanism in its entirety reciprocates with the slideout unit 24. By mounting the entire drive mechanism on the slideout unit 24, and not on fixed frame 34 or any other member which is part of the vehicle body 22, one can manufacture the slideout unit 24 and its drive mechanism as a modular unit and ship the modular unit to another site for assembly with or installation in a vehicle body 22 having a slideout opening 32 of the required size.

Figure 5:
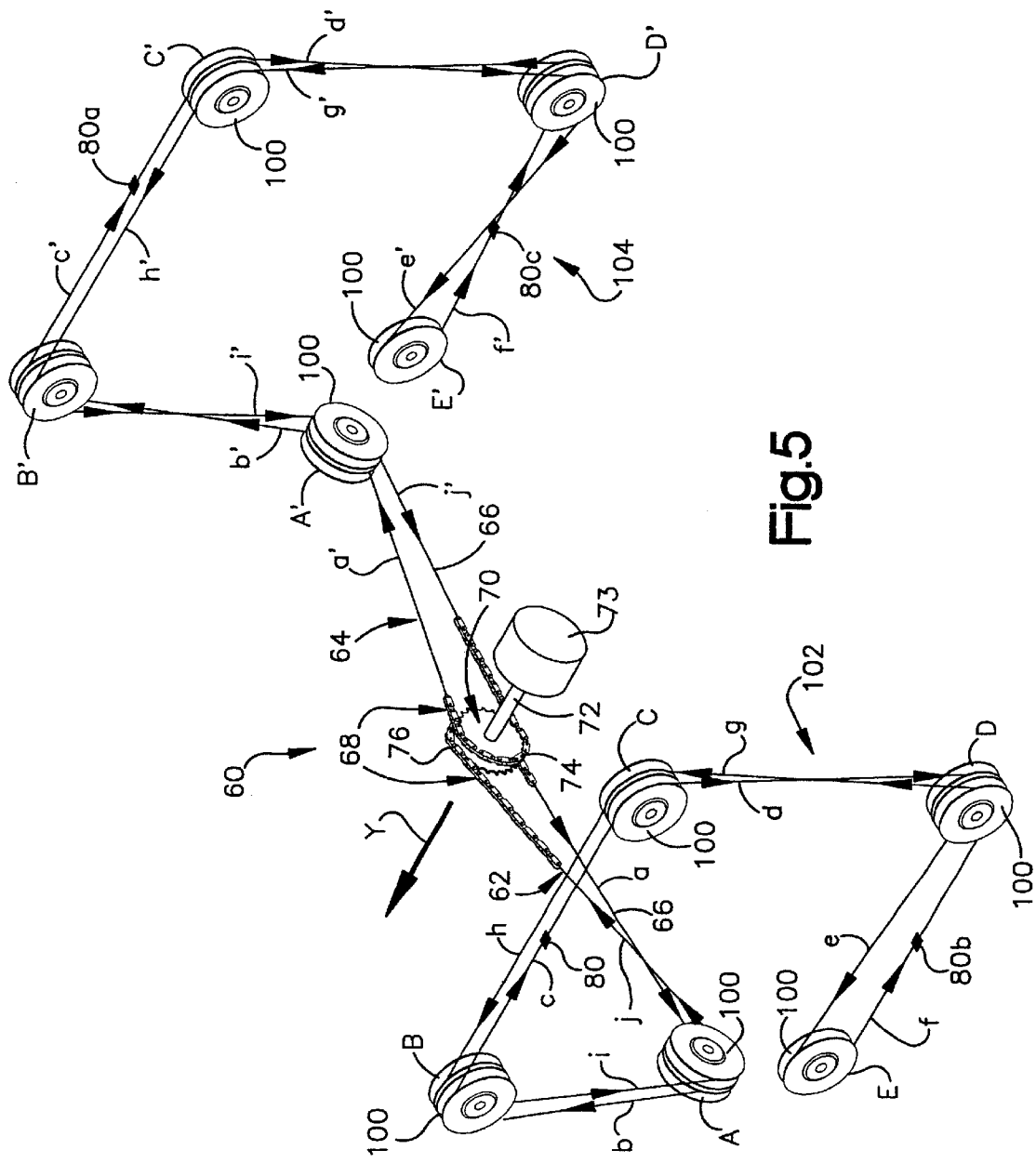
FIG. 5 is a diagrammatic perspective view of a drive mechanism for a slidable room assembly according to a first embodiment of this invention showing the drive mechanism in a first or slideout retracted position.

Referring now to FIG. 5, a drive mechanism, (or force transmission mechanism) 60 according to a first and preferred embodiment is shown displaced. This mechanism 60 comprises a pair of flexible, high modulus drive members, which are preferably endless cables 62, 64, as shown. (Only one cable is required in another embodiment, shown in FIGS. 7 and 8). Each of the endless cables 62, 64 comprises a substantial length of strong, flexible cable 66 joined at its ends to respective ends of a short length of chain 68 (e.g., 48 inches or 1.2 meters). The material forming cable 66 may be steel, nylon, or other strong, flexible high modulus material. The preferred cable material is 3/16 inch (4.8 mm) diameter steel. The short lengths of chain 68 of the endless cables 62, 64 engage respective axially spaced first and second sets of sprocket teeth of a double sprocket 70. The length of chain 68 must equal or exceed the sum of the amplitude of reciprocating movement of first slideout unit 24 and one-half the circumference of sprocket 70.

Figure 6:
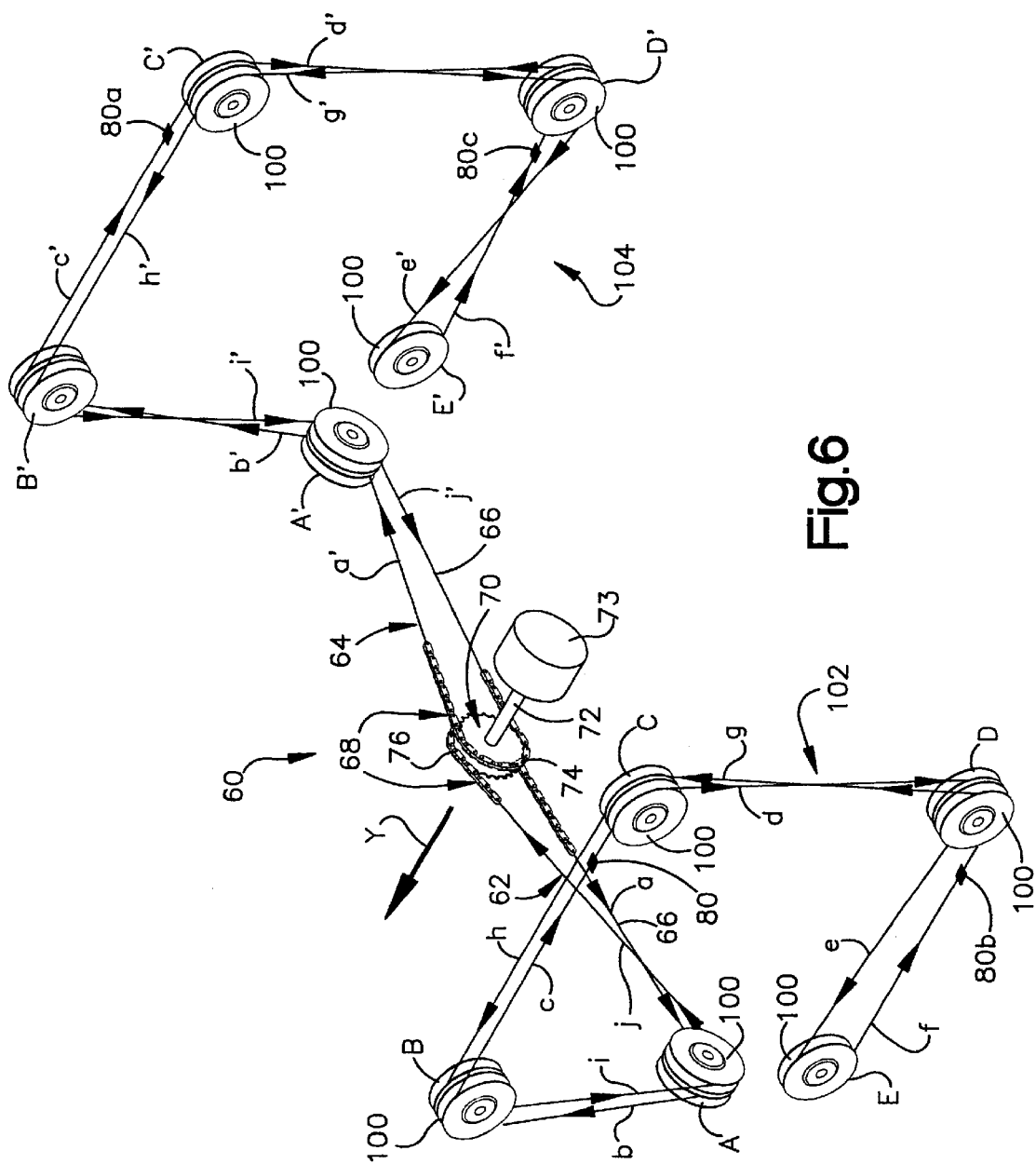
FIG. 6 is a diagrammatic perspective view of the drive mechanism shown in FIG. 5, showing the drive mechanism in a second or slideout extended position.

While cables are the preferred drive members (with or without a short length of chain 68 as illustrated in FIGS. 5 and 6), other flexible, high modulus drive members, such as v-belts, can also be used. A chain is less desirable than a cable for an entire drive member. The cables or other drive members should be taut at all times, and so a high modulus material should be used. A drive member material which has no tendency to creep is preferred; if the material does creep, periodic adjustment of tension will be required.

Figure 11:
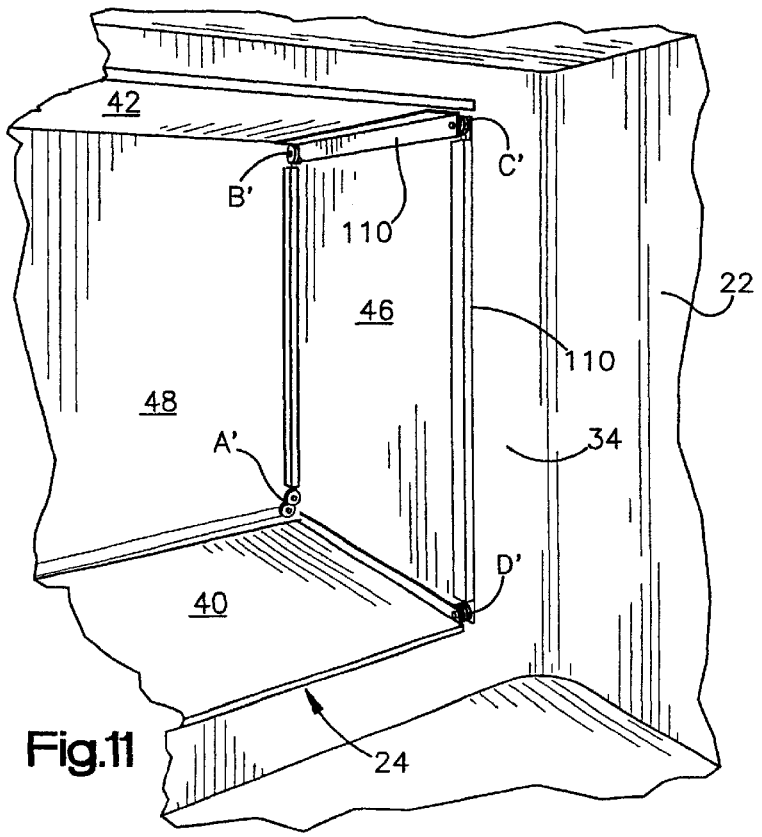
FIG. 11 is a perspective view of a portion of the interior of a slideout unit in accordance with this invention.
Figure 12:
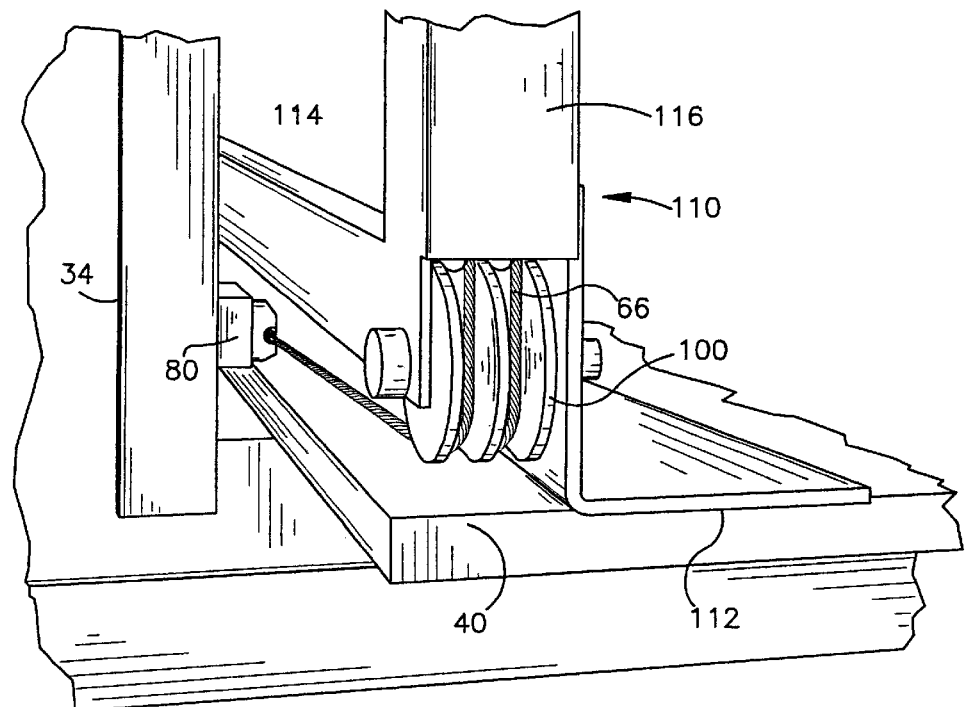
FIG. 12 is a perspective view of a portion of the apparatus of this invention, showing a cable attachment and anchor and a pair of sheaves on an enlarged scale.
Figure 13:
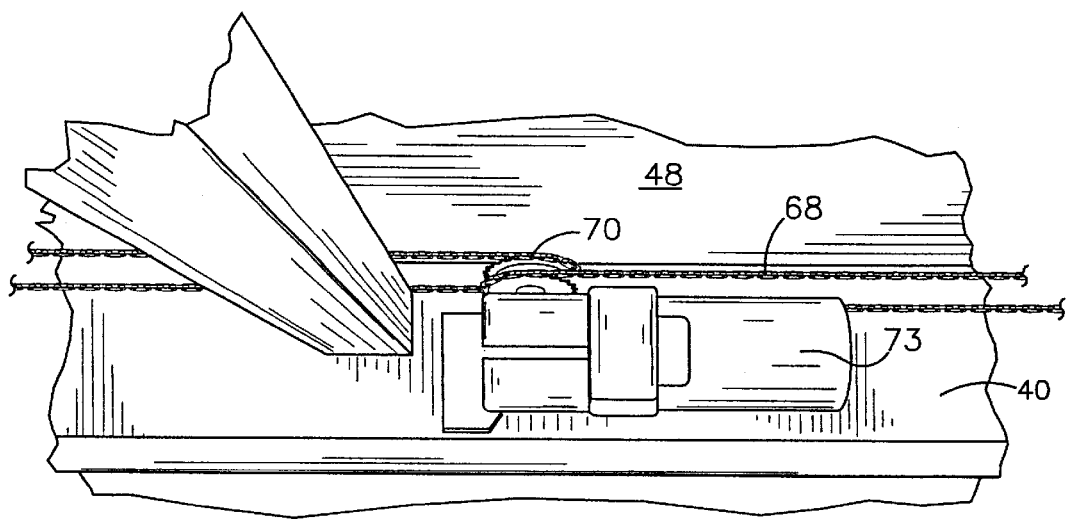
FIG. 13 is a top plan view looking down on a motor used in a first embodiment of the invention illustrated in FIGS. 5 and 6.

Sprocket 70 may be located in a lower portion of slideout unit 24, just above the floor 40 and just behind the forward or outside wall 48 of the slideout unit, as best seen in FIGS. 11 and 13. Sprocket 70 is mounted on a shaft 72 for rotation therewith, which may be a drive shaft. Shaft 72 extends along a center axis Y (see FIG. 5) of slideout unit 24, midway between side walls 44 and 46. Shaft 72 may be a drive shaft of an electric motor 73, which (when present)

may be mounted just above floor 70 of the slideout unit 24, close to outside wall 48. Alternatively, a portable motor (which is connected to drive shaft 72 only when the slideout unit 24 is to be moved), a hand crank (which may be connected to drive shaft 72), or manual power (applied through handles 50) may be used instead of electric motor 73. Whatever form of power input is used, it is advisable to lock the slideout unit in place when it is not in motion. A worm drive is one means (and a preferred means) for accomplishing this. The worm drive performs a locking function when the slideout unit 24 is at rest, locking the slideout unit 24 in place (in closed position when fully retracted, for example), so that lock 52 is not necessary. With other drive mechanisms, locking means (e.g., a cam lock, or clamp in the walls of slideout unit 24) must be used to retain the slideout unit 24 in position.

A plurality of anchors 80 are provided for securing the cable drive members 62, 64 to fixed frame member 34 of vehicle body 22. Four anchors 80, 80a, 80b, and 80c, i.e., two anchors for each cable drive member 62, 64, are highly preferred. These anchors 80 are mounted on fixed frame 34 (see FIG. 12) and clamp the endless cable drive members 62, 64, at spaced points as shown in FIGS. 5 and 6. When four anchors 80, 80a, 80b and 80c are used, two anchors 80 and 80b are disposed in vertically spaced relationship on one side of room slideout unit 24, and the other two anchors 80a and 80c are disposed in vertically spaced relationship on the other side of room slideout unit 24, as may be seen in FIGS. 5, 6 and 10. Two anchors 80, 80a are disposed in an upper portion of room slideout unit, above the center of mass CM (see FIG. 10) and the other two anchors 80b, 80c are disposed in a lower portion of room slideout unit 24, below the center of mass CM.

Figure 10:
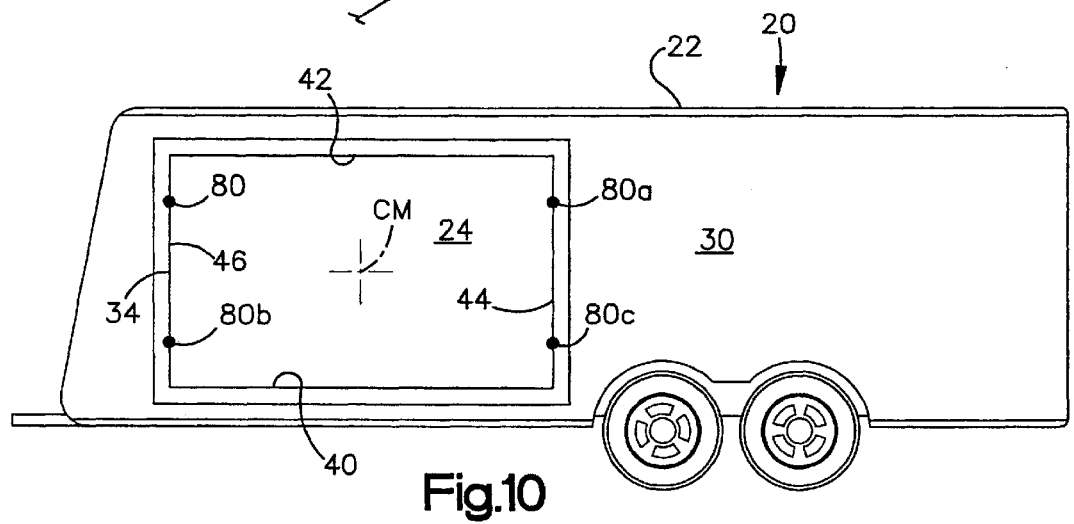
FIG. 10 is a schematic fragmentary side elevational view of a vehicle according to this invention, showing a room slideout unit and the positions of anchors which secure slideout unit cables to a fixed vehicle frame.

The reason why at least four anchors 80 are highly preferred may be seen with reference to FIG. 10. If one uses four anchors 80, 80a, 80b and 80c as shown in FIGS. 5, 6 and 10, i.e., two anchors 80, 80a in an upper portion of slideout unit 24, above the center of mass CM thereof, and the other two anchors 80b, 80c in a lower portion of slideout unit 24, below the center of mass CM, force is applied evenly to the slideout unit 24 so that the slideout unit 24 slides smoothly in a predetermined path along its axis of reciprocation Y. This places minimal stress on the guide means (discussed subsequently) for guiding the slideout unit 24. The slideout unit 24 is pulled as it slides. This requires a sturdier guide system, one which will support as well as guide slideout unit 24, than is necessary when four anchors are used. More than four anchors can be used, but this requires a more complex drive mechanism without commensurate benefit. The benefits of this invention are best obtained with four anchors arranged as described above.

Any device which is capable of securing or clamping a cable 66 (or other flexible drive member) to which body 22 (specifically to frame 34 thereof) can be used as an anchor. A few suitable structures are shown and described subsequently with reference to FIGS. 17 through 19B. It is preferred to use structurally identical anchors in any given installation.

Returning now to FIG. 5, drive mechanism 60 further comprises a series of sheaves 100. Sheaves 100 are idler wheels which serve as possible guides for guiding endless cables 62 and 64. Together with sprocket 70, sheaves 100 define the paths of endless cables 62 and 64.

Other types of guide members can be used when other types of drive members, e.g., v-belts or chains, are used instead of cables. The guide members may be an adjustable sheave, a sprocket for a pulley, for example; typically the guide member is a wheel of one sort or another. The type of drive member dictates the preferred form of guide member as is well known.

Sheaves 100 may be of conventional structure, each comprising a groove for receiving a cable portion 66 of endless cable 62 or 64. Sheaves 100 are arranged in two sets 102 and 104. A first set 102 disposed along a first or left (or rearward) side 44 of slideout unit 24, defines (together with sprocket 70) a path for the first endless cable 62. A second set 104, disposed along a second or right side 46 of slideout unit 24, defines (together with sprocket 70) a path for the second endless cable 64.

The first set 102 of sheaves 100 comprises four pairs A, B, C and D of sheaves, and a fifth sheave E, which is a single sheave. The sheaves 100 forming the first pair A have a common longitudinal axis (i.e., an axis which is parallel to the center axis Y and to the side walls 44 and 46 of the slideout unit 24). Each of the pairs B, C and D comprises two sheaves having a,common transverse axis (i.e., an axis which is perpendicular to the center axis Y and parallel to the forward or outside wall 48 of the slideout unit). Sheave E also has a transverse axis. The sheaves 100 forming each pair A, B, C and D are freely rotatable on their respective shafts and freely rotatable with respect to each other. All sheaves 100 rotate only when slideout unit 24 is being moved and are stationary at other times. The two sheaves 100 of each pair rotate in opposite directions during movement of, slideout unit 24, as will be hereinafter explained.

The first pair A of the first set 102 of sheaves 100 is located in a lower corner of the slideout unit 24, near the intersection of the slideout unit's floor 40, forward wall 48 and left side wall 44 (which is a rearward side wall relative to vehicle body 22 in the embodiment shown, wherein the slideout unit 24 is on the left side of the vehicle 20). The second pair B and third pair C of sheaves 100 are located near the slideout unit's ceiling 42, and near the forward and rearward ends, respectively, of the slideout unit 24. The fourth pair D of sheaves 100 and the fifth sheave E are preferably located below the floor 40 of the slideout unit 24, along the left side 44 of the unit 24 and near the rearward and forward ends, respectively, of the slideout unit. Similarly, sheaves A' through E' of the second set 104 are located in corresponding position adjacent to the right side wall 46 of slideout unit 24. The positions of the sheaves 100 in both sets 102 and 104 are shown diagrammatically in FIG. 5, and the positions of the sheaves in the second set 104 may also be seen pictorially in FIG. 11.

The first set 102 of sheaves 100, together with sprocket 70, collectively define a path for the first endless cable 62. This path comprises a plurality of courses, a through j, each course being defined as a segment of the endless cable 62 between the sprocket 70 and the first drive wheel, and between each pair of successive drive wheels in the drive train. Starting at the sprocket 70, a first outbound course a extends transversely from the sprocket 70 to one of the first pair A of sheaves 100. Successive outbound courses b, c, d, and e extend from the first pair A of sheaves 100 to the fifth and last sheave E, as shown in FIG. 5. Courses b through e are disposed alongside the left side 44 of the slideout unit 24. At the fifth and last wheel E, the first endless cable 62 reverses direction, and the return path comprises a plurality of courses f through i, from the fifth sheave E through the first pair A of sheaves, alongside the left side 44 of the slideout unit 24. Courses b through i (those disposed along the left side 44 of slideout unit 24) collectively form a first set of courses. Finally, a return course j extending from the first pair of sheaves 100 transversely back to the sprocket 70 completes the closed loop through which the first endless cable 62 moves.

Similarly, a second set 104 of sheaves 100, comprising a first pair A' of sheaves 100 having a longitudinal axis (at the lower right forward corner of the slideout unit 24) second through fourth pairs (B$^1$, C$^1$ and D$^1$) of sheaves 100, and a fifth sheave E', each having a transverse axis, together with the sprocket 70, define a path for the second endless cable 64. This path is a mirror image of the path for the first endless cable 62 and comprises courses a' through j'. Courses b' through i' are parallel and adjacent to the right side wall 46 of slideout unit 24 and form a second set of courses. Those courses a, a', j and j', which are parallel to the forward or outside wall 48 of slideout unit 24 (and are therefore perpendicular to side walls 44 and 46) form a third set of courses. All of the sheaves 100 in the second set 104 are located near the right hand (or forward) wall 46 of the slideout unit 24.

Sheaves 100 may be rotatably mounted on shafts which in turn are fixedly secured to a slideout unit frame 110. The slideout unit frame 110 may include a pair of L-shaped frame members 112, which are affixed to the floor 40 of slideout unit 24 and which extend close to respective slideout unit side walls 44 and 46 from a forward end to a rearward end of the slideout unit 24, (i.e., longitudinally or parallel to axis of reciprocation Y), and a pair of longitudinally extending channels which are affixed to respective L-shaped frame members 112. As a result, the axes of all of the sheaves 100 will reciprocate with slideout unit 24, and the sheaves 100 themselves will both reciprocate and rotate (as a result of cables 62 and 64 passing over the sheaves 100) as the slideout unit 24 is reciprocated.

The slideout frame structure may further include hollow sheaths 116 of rectangular cross section. These hollow sheaths 116 provide guide tracks for vertical courses of endless cables 62 and 64.

Anchors 80 and 80b are mounted in vertically spaced relationship on fixed frame 34 of which body 22, adjacent on side wall 44 of slideout unit 24, and engage cable 62 along courses c and f, respectively. (As will be noted, c is an outbound course and f is a return course.) Similarly, anchors 80a and 80c are mounted in vertically spaced relationship on fixed frame 34, adjacent to the other side wall 46 of slideout unit 24, and grip cable 64 along courses c' and f', respectively.

Figure 15:
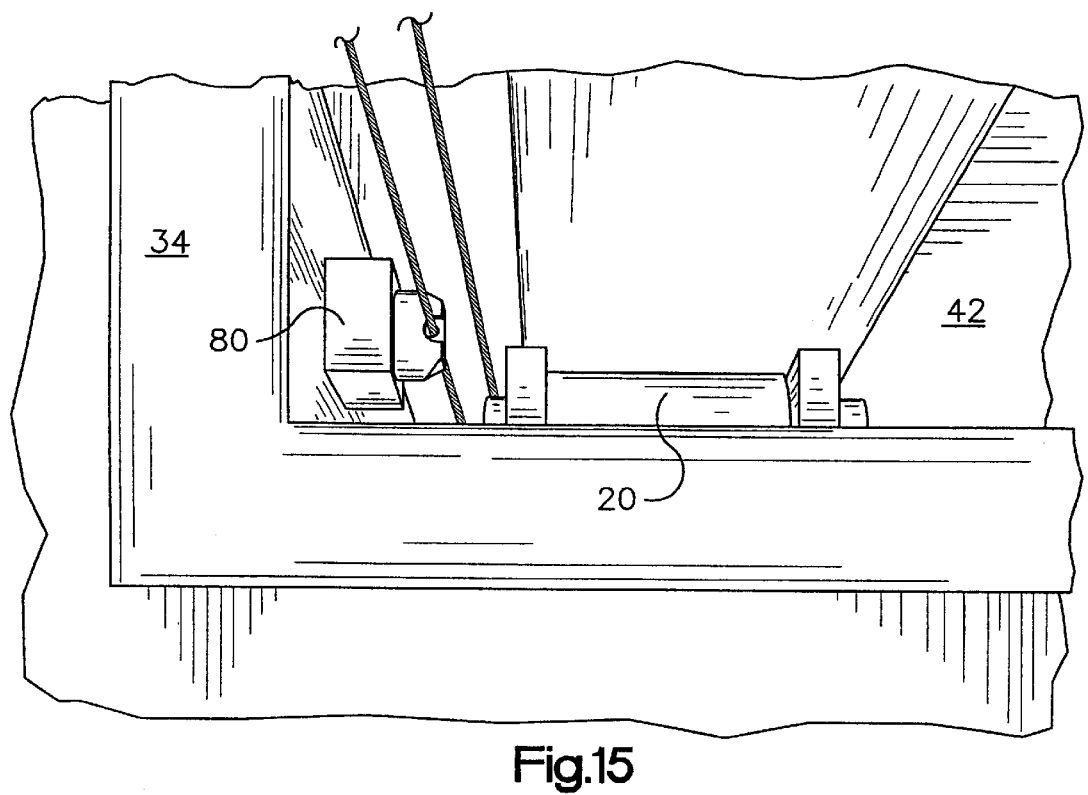
FIG. 15 is an elevational view of a portion of the interior of a slideable room assembly of this invention, looking up at the underside of a slideout unit and showing an anchor and a roller for positioning and supporting the slideout unit.
Figure 20:
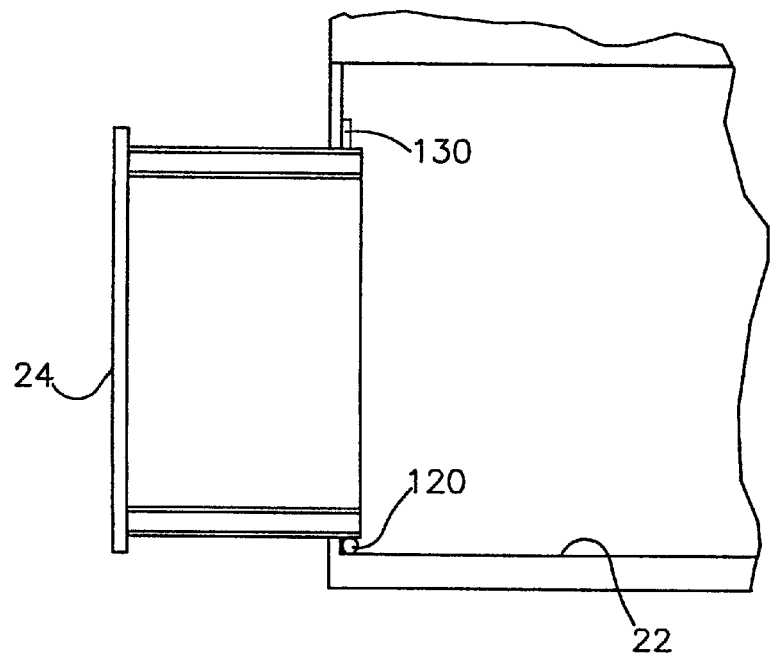
FIG. 20 is a diagrammatic side elevational view of a slideout unit according to this invention showing rollers for supporting the slideout unit and a limit stop for limiting outward movement of the slideout unit.

A plurality of roller assemblies 120 (see FIGS. 15 and 20) may be provided for smooth reciprocation of slideout unit 24 relative to vehicle body 22. These roller assemblies 120 may include a roller which engages the underside of slideout unit floor 40, and which is rotatably mounted in a mounting bracket affixed to the floor of vehicle body 22. If desired, the mounting of roller assemblies 120 can be reversed, so that the roller assemblies 120 are rotatably mounted in mounting brackets on the underside of slideout unit floor 40 and engage the floor of which body 22 in rolling relationship. In either case, the roller assemblies may be located close to side edges of slideout unit floor 40.

The roller assemblies 120 furnish sufficient support for slideout unit 24 when four anchors 80, 80a, 80b and 80c are used.

A limit stop 130 (FIG. 20) may be provided to limit outward movement of the slideout unit 24.

Sliding movement of the slideout unit 24 may be guided by the endless cables 62, 64. Because these cables are taut and are formed of high modulus material, no additional guiding system is necessary in preferred embodiments employing four anchors. However, guide means, comprising for example slide blocks (to be discussed hereinafter), are desirable, although not required.

Operation of an apparatus according to a first embodiment of this invention will now be described with particular reference to FIGS. 1, 2, 5 and 6.

When a slideout unit 24 of a vehicle is in a first or retracted position, as shown in FIG. 1, drive mechanism 60 is in a first position, as shown in FIG. 5. The chain portion 68 of each endless cable 62 and 64 makes a one-half turn around sprocket 70, with most of the remaining length of the chain portion disposed on a return course j or j', with only a very small part of each chain 68 disposed along an outbound course a or a' of endless cable 62 or 64. Anchors 80 are disposed along respective courses c, c', f and f', at distances from respective sheave pairs C, C', D and D' which exceed the amplitude of reciprocatory movement of slideout unit 24.

When it is desired to move slideout unit 24 from the first or retracted position shown in FIG. 1 to the second or extended position shown in FIG. 2, motor 73 is started by means of a switch (not shown) and is caused to turn in one direction. Motor 73 drives double sprocket 70, which in turn drives endless cables 62 and 64 in the direction of the arrows in FIGS. 5 and 6. This causes sheaves 100 (which is previously noted are rotatably mounted on the slideout unit 24) to rotate. The endless cables also move relative to sheaves 100 in the direction of the arrows. Since certain courses (c, c', f and f') of the endless cables 62 and 64 are secured in fixed position relative to the vehicle body 22 by anchors 80, the entire slideout unit 24, including sheaves 100, moves axially along axis Y in the direction of the arrow as shown in FIGS. 5 and 6, until the slideout unit 24 reaches the outward or extended position shown in FIG. 2. When slideout unit 24 is in the extended position shown in FIG. 2, the state of drive mechanism 60 is as shown in FIG. 6. That is, most of the length of chain portion 68 of endless cables 62 and 64 either engages sprocket 70 (extending one-half turn therearound) or extends outwardly along outbound courses a and a' of respective cable 62 and 64, only a small length of chain remains along return courses j and j'. Meanwhile, anchors 80 are close to their respective sheave pair C, C', D and D'. Actually the anchors 80 have stood still while the sheaves 100 have moved outwardly along axis Y.

To return the slideout unit 24 to the retracted position shown in FIG. 1, and the drive mechanism 60 to the state shown in FIG. 5, motor 73 is caused to turn in the opposite direction, and the endless cables 62, 64 move in the direction opposite that shown by the arrows.

Figure 7:
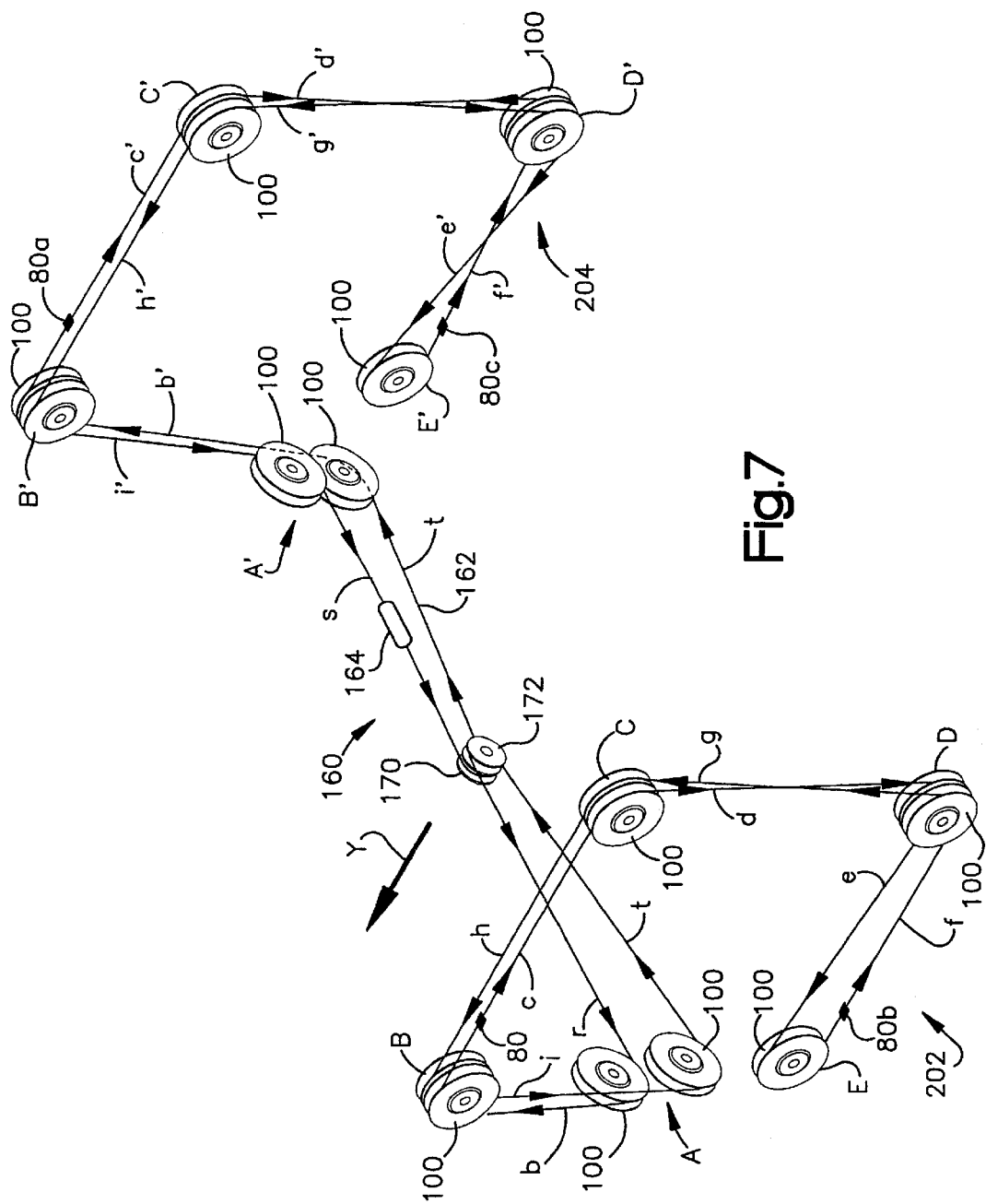
FIG. 7 is a diagrammatic perspective view of a drive mechanism according to a further embodiment of the invention, showing the drive mechanism in a first or slideout retracted position.
Figure 8:
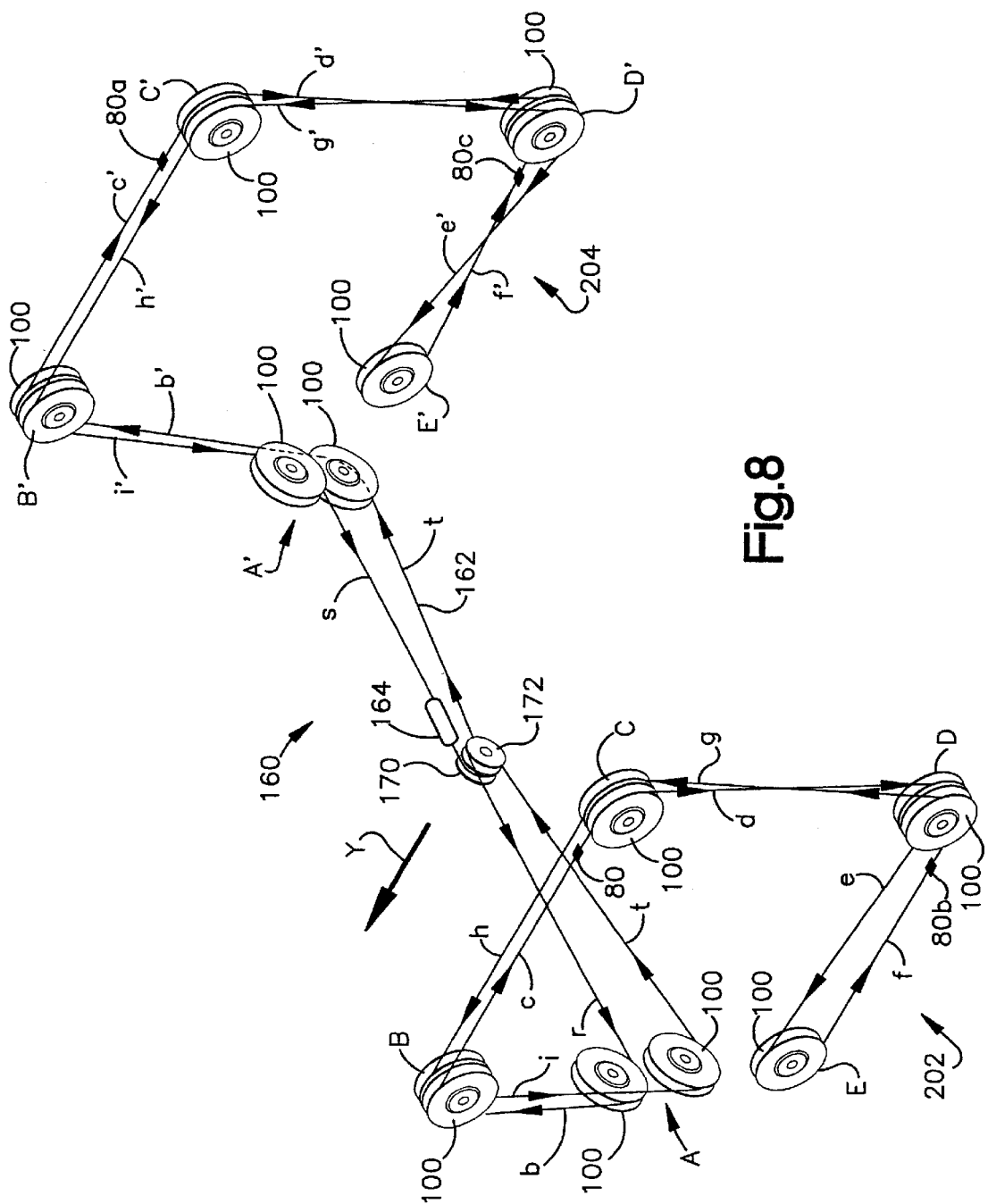

FIGS. 7 and 8 illustrate a drive mechanism 160 according to a second embodiment of this invention. In this embodiment, the drive mechanism 160 comprises a single endless cable 162, instead of the pair of cables shown in FIGS. 5 and 6. This single endless cable 162 may be formed by 3/16 (4.8 mm) steel cable (the same cable material as is preferred in the embodiment of FIGS. 5 and 6), whose ends are joined together, e.g., by a turnbuckle, adjustable tensioner, eye-bolt, or other linking member 164 attached to the ends of the cable. This embodiment is ordinarily intended for hand operation of the slideout unit 24, and so there is no counterpart of the sprocket 70 or motor 73 shown in FIGS. 5 and 6. Instead, a spool 170, which is a passive or idler member, mounted on shaft 172, may be provided. The axis of shaft 172 coincides with an axis of reciprocation (or center line) Y of the slideout unit 24. A single loop of cable is looped over spool 170. If desired, however, a motor (either a permanent motor similar to motor 73 in FIGS. 5 and 6, or a portable motor which is connected to shaft 172 only when needed) may be provided. The exterior of slideout unit 24 is provided with handles 50 and a locking device 52 as shown in FIG. 2. A locking device is essential in this embodiment to prevent unwanted access to the interior or inadvertent opening because the drive mechanism of this embodiment does not provide any locking (except when a worm drive, as described previously with reference to FIGS. 5 and 6, is provided).

The sheaves 100 are located in exactly the same position as in the embodiment of FIGS. 5 and 6 with one exception. The sheaves of pairs A and A', in respective sets 202 and 204 of sheaves 100, are axially offset as shown in FIGS. 7 and 8. This avoids interference between different courses of cable 162 as they travel from sheaves A to sheaves A' or vice versa. The remaining sheaves in each set, i.e., sheaves B, C, D and E in set 302, and sheaves b', c', d' and e' in set 304, are in the same positions as their counterparts in FIGS. 5 and 6 and FIGS. 7 and 8. The first and second sets of courses (b through i and b' through i'), and the locations of the anchors 80, 80*a*, 80*b* and 80*c* which attach the cable 162 to the vehicle body 22, are the same as in FIGS. 5 and 6. The third set of courses comprises course m, leading from the linking member 164 to a sheave in pair A; course n, which leads from a sheave in pair A' to the linking member 164, and course p, which leads from a sheave in pair A to a sheave in pair A' with a single loop over the spool 170. It will be noted that courses m and n, which collectively extend between sheaves in pairs A and A' and which travel in one direction as shown by the arrows in FIGS. 7 and 8, are at a higher elevation than course p, which also extends between sheaves in pairs A and A' and which travels in the opposite direction from courses m and n when slideout unit 24 is in motion, by virtue of axial and elevational displacement of one sheave 100 relative to the other in each of the pairs A and A'. This axial and elevational displacement makes travel without interference possible.

FIG. 7 illustrates the state of drive mechanism 160 when the slideout unit 24 is in the retracted position (FIG. 1), and FIG. 8 illustrates the state of the drive mechanism 160 when the slideout unit 24 is in the extended position (FIG. 2). One will note that the anchors 80 in FIG. 7 have the same positions as in FIG. 5, and that the anchors 80 in FIG. 8 occupy the same positions as in FIG. 6.

In the embodiment shown in FIGS. 7 and 8, a user grabs both handles 50 on the exterior of the slideout unit 24, either pulling the slideout unit 24 outwardly toward the extended position shown in FIG. 2, or pushing the slideout unit 24 inwardly toward the retracted position shown in FIG. 1. As the slideout unit 24 is pulled outwardly, the endless cable 162 of drive mechanism 160 moves in the direction of the arrows, from the state shown in FIG. 7 to the state shown in FIG. 8. When the slideout unit 24 is pushed inwardly, exactly the reverse occurs.

The drive mechanism 160 of this embodiment causes force to be applied evenly to the top, bottom and both sides of the slideout unit 24, whether the user applies force evenly or unevenly to the two handles 50. This causes force to be exerted smoothly on the slideout unit 24 insuring smooth reciprocation of the slideout unit 24 as it is moved from one position to the other.

Figure 9:
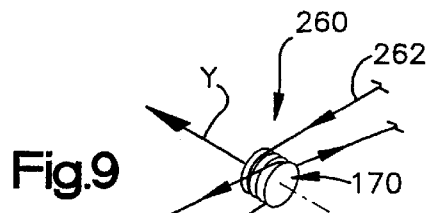
FIG. 9 is a fragmentary diagrammatic view showing a modified form of a portion of the drive mechanism of FIG. 7.

FIG. 9 shows a further embodiment of drive mechanism 260 according to this invention. In this embodiment an endless cable 262 is formed by joining opposite ends of a steel cable directly together, rather than through a linking member as in the embodiment of FIGS. 7 and 8. Otherwise, the structure and operation of this embodiment are the same as the structure and operation in the embodiment of FIGS. 7 and 8.

Figure 14:
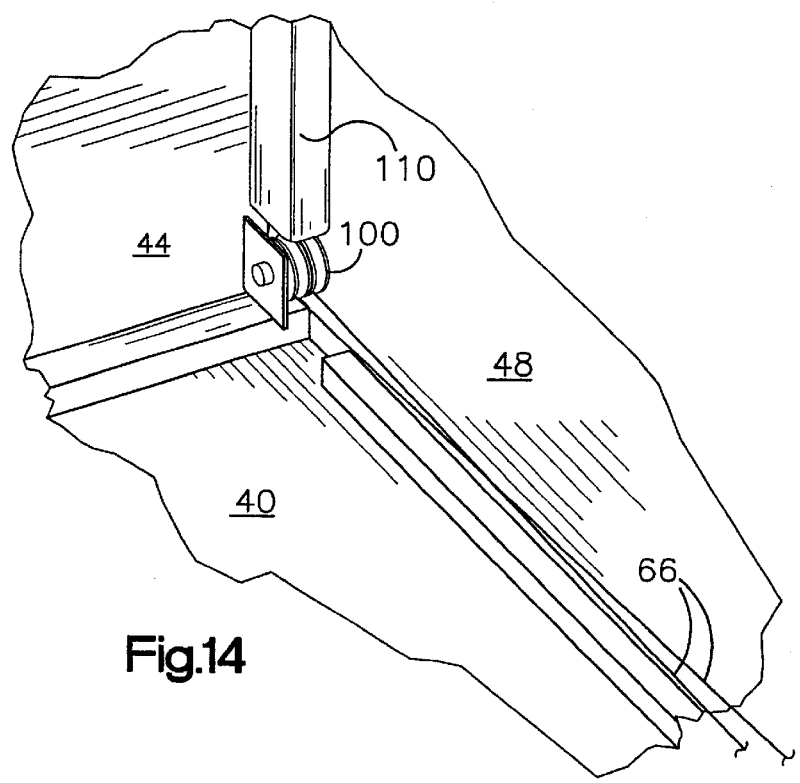
FIG. 14 is a perspective view of a portion of the interior of a slideout unit according to a further embodiment of this invention in which cables cross over in proximity with the outside wall of the slideout unit.

A still further modification is shown in FIG. 14. In this embodiment, the sheaves 100 of pairs A and A' are axially aligned, as in FIGS. 5 and 6. A single endless cable 66 is formed by joining opposite ends of a steel cable together, as in FIG. 9. However, there is no motor or sprocket as in FIGS. 5 and 6, and no spool as in FIGS. 7, 8 and 9. Instead, two courses of cable 66 cross over as they travel from a sheave 100 of pair A to a sheave 100 of pair A' or vice versa.

Various forms of anchors according to this invention will now be described. These can be used wherever an anchor 80 (or 80*a*, 80*b*, or 80*c*) has been shown diagrammatically.

Figures 16, 16A:
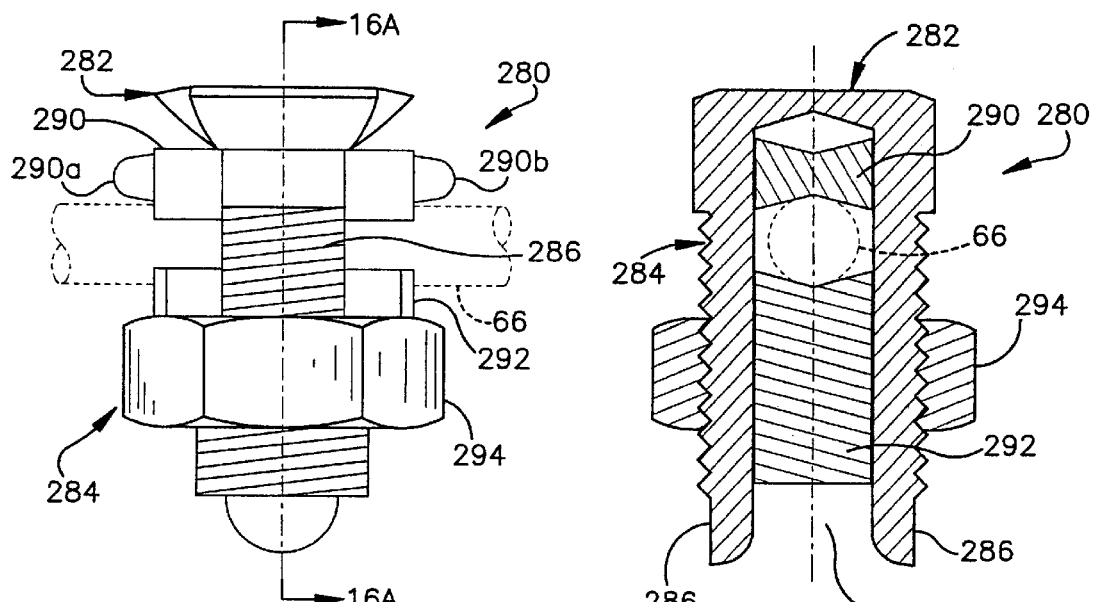
FIG. 16 is a front elevational view of an anchor according to one embodiment for securing a cable to a frame of the vehicle body.
FIG. 16A is a vertical sectional view taken along line 16A—16A of FIG. 16.

A first form of anchor is shown in FIGS. 16 and 16A.

Referring now to FIGS. 16 and 16A, each of the anchors 280 comprises a base portion 282, which is affixed to vehicle body 22 and preferably to frame 34 which surrounds opening 32, and a cable grip portion 84. As illustrated particularly in FIGS. 16 and 16A, the grip portion 284 may comprise a pair of laterally spaced prongs 286 which are set far enough apart to form a slotted opening 288 (which is closed at one end close to base 282 and open at an opposite end) for receiving cable 66. A pair of axially spaced clamping members 290 and 292 receive the cable 66 between them and clamp the cable in place. First clamping member 290 is a floating element, positioned close to base 282 and having end collars 290*a*, 290*b* to retain it in the slot 288. Second clamping member 292 is axially adjustable by means of an adjusting nut 294. To this end clamping member 292 has end collars 292*a*, 292*b* which engage axially opposite ends of adjusting nut 294. Adjusting nut 294 has internal screw threads for engaging external screw threads formed on prongs 286.

Figure 17:
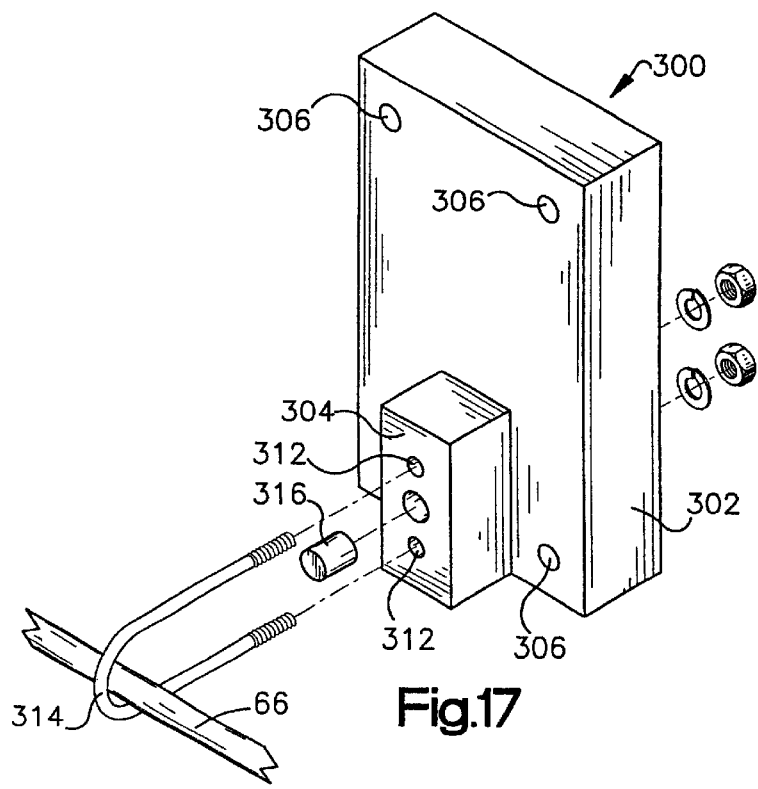
FIG. 17 is an exploded view of an anchor according to a second embodiment of this invention.

FIGS. 17 through 17C show an anchor 300 according to another and preferred embodiment of this invention. A cable anchor 300 according to this invention comprises a machined or molded plastic block of suitable polymeric material, e.g., "DELRON™". The polymeric material forming anchor 200 is a highly stable cross-linked polymer which has a low coefficient of thermal expansion and does not undergo cold flow or hot flow. The polymer forms a friendly surface for cable 66.

Anchor 300 may be of molded plastic and may comprise two portions, i.e., a base portion 302 or rectangular cross-section, and an extension 304 which is fused to base portion 302. Extension 304 is also of rectangular cross-section but is of smaller width and height than base portion 302. Anchor 200 may be attached to a fixed frame member 34 of vehicle body 22 by four bolts 306 which pass through bolt holes located near the four corners of base portion 302. A shim plate 308 (typically 14 gauge or thinner), interposed between anchor 304 and the frame member, is provided if needed to obtain desired spacing. Shim plate 308 has two parallel horizontal slots 310, extending from a vertical edge to allow bolts 306 to pass through. A pair of horizontal bolt holes 312 which extend through the entire thickness of anchor 300 (i.e., portions 302 and 304), receive a v-bolt 314, which clamps a cable 66 in place against the anchor 300. Extension 304 may be provided with an insert 316 of soft material (e.g., lead) which protrudes slightly, to provide a bearing surface for cable 66.

The anchor blocks 300 position and guide the room slideout unit 24 in addition to securing cables 66 to fixed frame 34. The lateral positioning afforded by anchor blocks 300 is sufficient when four points of attachment of anchors 80 are provided. The anchor blocks 300 have rubbing surfaces which rub against wall surfaces of the slideout unit 24 (e.g., exterior surfaces of walls 44 and 46 of slideout unit 24). In short, blocks 300 form guides, slides and cable ties.

A further form of anchor suitable for this invention is shown in FIGS. 18, 18A and 18B. This embodiment is well suited for use with cargo vans and other lighter vehicles. Referring now to FIGS. 18, 18A and 18B, the anchor of this embodiment is a bolt 320 comprising an externally screw-threaded shank 322. Shank 322 has a slot 324 for receiving a cable 66 and clamping the cable in place. Slot 324 has a radially extending portion for permitting the cable to be inserted and removed, and an axially extending portion for receiving the cable in clamping position. A removable cable clamp 326 holds the cable 66 in place. Shank 322 is threadedly received by two nuts 328 and 330, which are positioned on opposite sides of a frame member 34 to which bolt 320 is secured. Bolt holes for shank 322 are formed in the frame 34 at the locations at which bolts 320 are positioned.

To secure a cable 66 to frame 34, it is first necessary to form bolt holes in the frame at the desired locations. Then shanks 322, with nuts 328 in place between the two ends of the shanks, are inserted into the bolt holes. Nuts 330 are then affixed. Then shank 322 is moved axially to "open" position shown in FIG. 18A, in which the radially extending portion of slot 324 is fully exposed. Axial movement can be accomplished by turning one of the nuts 328 or 330. Arrows 332 and 324 indicate the direction of axial movement and the direction of rotational movement, respectively, as shank 322 is moved to open position. Cable 66 is then inserted with cable clamp 326 removed, and cable clamp 326 is then inserted in place. Shank 322 is then moved to "closed" position (FIG. 18B).

Figure 19:
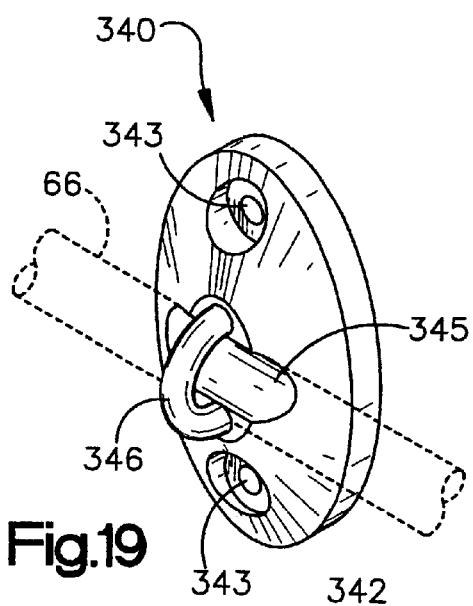
FIG. 19 is a perspective view of an anchor according to a still further embodiment of this invention.
Figure 19A:
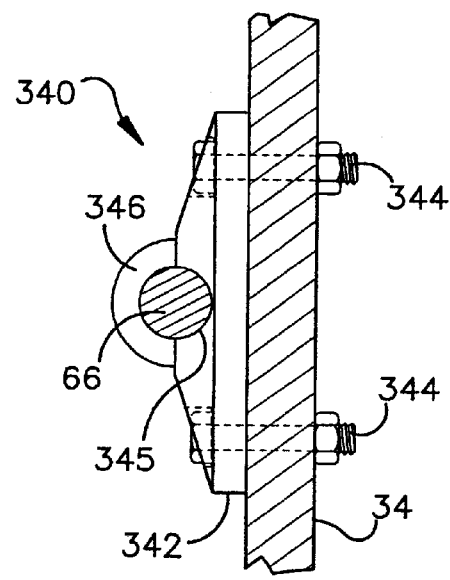
FIG. 19A is a diagrammatic view of an installation comprising the anchor of FIG. 19.

FIGS. 19 and 19A show another form of anchor. Anchor 340 according to this embodiment comprises a plastic block 342, which may be of oblong shape. The plastic material used for the anchor of FIGS. 17 to 17C may also be used here. Block 342 has a pair of bolt holes 343 near its end, to receive bolts 344, which secure anchor 340 to frame 34. A pocket or recess 345 of arcuate shape may be provided to receive and position a cable 66. A removable v-bolt 346, which passes through holes in block 342, holds cable 66 in place.

This embodiment of anchor (unlike that of FIG. 17) requires separate slides (not shown) to provide surfaces for relative sliding movement between the slideout unit 24 and the vehicle body 22 and to position the slideout unit 24 horizontally for sliding movement.

The arrangement of sheaves can be inverted from top to bottom, or reversed from forward end 48 to rearward end of the slideout unit 24, or both, if desired.

When sheaves are inverted from top to bottom, sheave pairs A and A' are mounted near the seating 42 of slideout unit 24, so that the third set of courses of the endless cable (the courses which cross over from one side of the slideout unit to the other, e.g., from left side 44 to right 46 or vice versa), are near the seating of the slideout unit. Similarly, sheave pairs D and D' and sheaves E and E' would also be disposed near the ceiling 42. Sheaves pairs B, B', C and C' would be rotatably mounted near the floor 40 of slideout unit 24. This variation may be particularly desirable when the drive mechanism of this invention is used to reciprocate a storage slideout unit 26 or similar structure.

When the location of all sheave pairs or subsets is reversed from forward to rearward portion of the slideout unit 24, sheave pair A and A' are disposed near a rearward end of the slideout unit, and sheave pairs B and B' and sheaves E and E' are similarly disposed toward a rearward end. Sheave pairs C and C', and D and D' would then be located near a forward end of the slideout unit.

It is highly desirable both to invert and reverse the positions of sheaves 100, as described immediately above, when a drive mechanism according to this invention is used to effect sliding movement of a storage slideout unit 26.

A preferred second slideout unit or compartment 26 is shown in FIG. 4. This second slideout unit or compartment is particularly useful for storage, e.g., of luggage, tools, or smaller household items). Any number of storage slideout units 26 may be provided in virtually any location on the vehicle. A storage slideout unit 26 is disposed in a lower portion (or skirt) 36 of a side wall 30 of vehicle body (on either the left side or the right side of the vehicle 20), below the level of the vehicle floor, and extends down to the bottom edge of the vehicle side wall. This slideout unit 26 is reciprocable between a closed or retracted position shown in FIGS. 1 and 2, and an open or extended position shown in FIG. 4. Storage slideout unit 26 may be an open top structure comprising a bottom wall 352, a forward wall 354 (which may be flush with vehicle side wall 30 when the slideout unit 26 is retracted), a back wall 356, and opposite side walls 358. An electric motor 373 may be mounted on an upper portion of back wall 356 to effect opening and closing movement of storage slideout unit 26.

Horizontal reciprocation of slideout unit 26 may be accomplished by any of the drive mechanisms discussed hereinbefore with respect to FIGS. 5–9. Motor 373 drives cable(s) 66 (either one or two cables, depending on the drive mechanism chosen). The arrangement of cables can be simplified compared to the arrangements shown in FIGS. 5–8. In the arrangement of FIG. 4, cables 66 extend horizontally from motor 373 to the first pairs A and A' of sheaves on either side of slideout unit 26. The cables continue horizontally near upper edges of slideout unit 26 to second pairs C and C' of sheaves 100. (This arrangement has no counterpart of sheaves B, B'). The path of cable(s) 66 then extends downwardly to sheaves D, D' in corners near floor or bottom wall 352 and forward or outside wall 354, then to single sheaves E, E' adjacent to floor 352 and back wall 356. The path of cable(s) reverses at sheaves E, E' and returns to motor 373. In addition, a vertical lift-up mechanism, which does not form part of this invention, can be used to lift up the floor 352 (or horizontal platform member, not shown, mounted immediately above floor 352) to a convenient height if desired.

Instead of continuous or endless cable drive members shown, one can use "straight" cables or other drive members, i.e., drive members which have ends.

Referring now to FIGS. 5 and 6, cable 62 can terminate at anchors 80 and 80b, eliminating courses d and c. Similarly, cable 64 can terminate at anchors 80a and 80c. The anchors then become end anchors, which may be of one of the structures shown or of other structures. Suitable structures are known in the art. In the embodiment of FIGS. 7 and 8, the single endless cable 162 may be replaced with two cables, i.e., one extending from anchor 80c to anchor 80, the other extending from anchor 80b to anchor 80a, eliminating courses d, e, d' and e'. Four points of attachment (at 80, 80a, 80b and 80c) are essential in this modification. The endless cables shown represent preferred embodiments, however.

The drive mechanism is shown as being mounted on the slideout unit in each of the embodiments illustrated. However, if desired, this mechanism, including the sprocket 70 (where applicable) or spool 170 (where applicable) and the sheaves 100 (in all embodiments) may be mounted on fixed frame members which form part of the vehicle body 22 (or first module). In that case, the anchors 80 would be mounted on frame members associated with the slideout unit 24 (or second module). This is considered a less desirable arrangement. Forces in this arrangement would be concentrated at the anchors (or attachment members), while force transmission in the more preferred embodiments shown in the drawings is more diffuse, being spread out not only over the anchors or attachment members but over the idler wheels in respective mountings as well.

The present invention affords a simple and reliable drive mechanism for a vehicle slideout unit. This drive mechanism is simpler and more reliable than vehicle slideout drive systems which are presently known. The drive mechanism of the present invention assures that the slideout unit will advance and retract smoothly and evenly, whether power is applied manually or with a motor. Because of the simplicity of the present drive mechanism, there is less that can go wrong than is the case with presently known vehicle slideout operating systems.

The system of the present invention can be installed at the factory as a modular room, which reduces labor costs.

The present invention can be used as a retrofit for existing vehicles both trailers and self-propelled vehicles such as recreational vehicles (RVS). The preferred embodiments, wherein the slideout unit 24 supports the entire drive mechanism, including cable(s), guide sheaves, and a motor where desired, are particularly advantageous in this regard. The present invention can also be incorporated in new vehicles when they are built.

These and other advantages are obtained in assemblies according to this invention.

While the present invention has been described with particular reference to a vehicle, it will be seen that this invention is also applicable to other structures. Such structures may comprise a base unit (or first module) and a slidable unit (or second module) which is reciprocable in an opening in a wall of the base unit between first and second positions relative to the base unit. For example, this invention may be applied to a cabinet having a wall with one or more openings and comprising one or more drawers, each of which is slidably mounted in such opening and is moveable in a reciprocating manner between a closed position and an open position. In general, this invention is particularly useful for the movement of reciprocating members having substantial weight, as for example a slideout unit of an automotive vehicle.

While this invention has been described in detail with respect to specific embodiments thereof, it shall be understood that such description is by way of illustration and not by way of limitation.

Various modifications can be made without departing from the scope and spirit of this invention.

What is claimed is:

1. A slideout assembly of the type having a body with a plurality of exterior walls, at least one of which has an opening and a slideout unit disposed in the opening and reciprocable between an extended position and a retracted position, wherein the improvement comprises:
   two flexible drive members;
   a drive mechanism for alternately pulling the flexible drive members to reciprocate the slideout unit between the extended position and the retracted position, the drive mechanism being mounted on either the assembly body or the slideout unit;
   a series of guide members to guide the flexible drive members through a predetermined path; and
   a plurality of anchors for fixedly securing the flexible members to positions about the opening of the body, the plurality of anchors being attached to either the assembly body or the slideout unit, the plurality of anchors comprising at least two vertically spaced apart anchors fixedly securing each flexible drive member.

2. The slideout assembly according to claim 1, wherein the body is a vehicle body.

3. The slideout assembly according to claims 1, wherein the drive mechanism comprises a motor.

4. The slideout assembly according to claim 1, wherein the flexible drive members are supported by the slideout unit and are secured to the body.

5. The slideout assembly according to claims 4, wherein the drive mechanism is also mounted on the slideout unit.

6. The slideout assembly according to claim 1, wherein the plurality of anchors comprises at least four points of attachment.

7. The slideout assembly according to claim 1, wherein the drive mechanism is mounted on the slideout unit and the plurality of anchors is attached to the assembly body.

8. The slideout assembly according to claim 1, wherein the drive mechanism is mounted on the assembly body and the plurality of anchors is attached to the slideout unit.

9. The slideout assembly according to claim 1, wherein the plurality of anchors comprises a first pair of vertically spaced anchors disposed on a first side of the slideout unit and a second pair of vertically spaced anchors disposed on a second side of the slideout unit, each pair of anchors comprising a first anchor disposed in an upper portion of the slideout unit and a second anchor disposed in a lower portion of the slideout unit, whereby there are at least four points of attachment.

10. The slideout assembly according to claim 1, wherein force from the drive mechanism is transmitted evenly through the flexible members to upper and lower positions on opposite sides of the slideout unit.

11. The slideout assembly according to claim 1, wherein each flexible drive member is an endless drive member.

12. A slideout assembly of the type having a body with a plurality of exterior walls, at least one of which has an opening and a slideout unit disposed in the opening and reciprocable between an extended position and a retracted position, wherein the improvement comprises:
   a rotatable sprocket;
   two flexible drive members drivingly engaging the rotatable sprocket;
   two sets of guide members to guide the flexible drive members through a predetermined path; and
   a plurality of anchors for fixedly securing the flexible drive members to one of the assembly body or the slideout unit, the plurality of anchors comprising at least two vertically spaced apart anchors fixedly securing each flexible drive member.

13. The slideout assembly according to claim 12, wherein the guide members are positioned about the body opening.

14. The slideout assembly according to claim 12, further comprising:
   a locking mechanism attached to the rotatable sprocket.

15. The slideout assembly according to claim 12, wherein the rotatable sprocket is mounted on the slideout unit and the plurality of anchors are attached to the assembly body.

16. The slideout assembly according to claim 12, wherein the rotatable sprocket is mounted on the assembly body and the plurality of anchors are attached to the slideout unit.

17. The slideout assembly according to claim 12, further comprising:

a motor connected to the rotatable sprocket.

18. The slideout assembly according to claim 12, wherein the flexible drive members are adapted to non-slippingly engage the rotatable sprocket.

19. The slideout assembly according to claim 12, wherein the plurality of anchors comprises a first pair of vertically spaced anchors disposed on a first side of the slideout unit and a second pair of vertically spaced anchors disposed on a second side of the slideout unit, each pair of anchors comprising a first anchor disposed in an upper portion of the slideout unit and a second anchor disposed in a lower portion of the slideout unit, whereby there are at least four points of attachment.

20. In an assembly of the type having a body with a plurality of exterior walls, at least one of which has an opening and a slideout unit having a plurality of corners, the slideout unit being disposed in said opening and reciprocable between an extended position and a retracted position, wherein the improvement comprises:

two flexible drive members;

a series of guide members to guide the flexible drive members through a predetermined path, the guide members being attached to the body; and a plurality of anchors for fixedly securing the flexible drive members to the slideout unit, the anchors being attached to the slideout unit, the plurality of anchors comprising at least two vertically spaced apart anchors fixedly securing each flexible drive member.

21. In an assembly of the type having a body with a plurality of exterior walls, at least one of which has an opening and a slideout unit having a plurality of corners, the slideout unit being disposed in said opening and reciprocable between an extended position and a retracted position, wherein the improvement comprises:

at least one flexible drive member;

a series of guide members to guide the flexible drive members through a predetermined path;

a plurality of anchors for fixedly securing the flexible drive members to the slideout unit; and a means for locking the at least one flexible drive member for preventing movement of the at least one flexible drive member.

22. The assembly according to claim 21, further comprising:

a means for driving the at least one flexible drive member, the means for driving pulling on the at least one flexible drive member in order to reciprocate the slideout unit, the means for driving includes the means for locking.

23. The assembly according to claim 22, wherein the means for driving includes a worm gear.

24. The slideout assembly according to claim 1, wherein the guide members are all mounted on the assembly body or are all mounted on the slideout unit.

25. In an assembly of the type having a body with a plurality of exterior walls, at least one of which has an opening and a slideout unit having a plurality of corners, the slideout unit being disposed in said opening and reciprocable between an extended position and a retracted position, wherein the improvement comprises:

at least one flexible drive member;

a series of guide members to guide the at least one flexible drive member through a predetermined path, all the guide members being attached to the slideout unit; and a plurality of anchors for fixedly securing the at least one flexible drive member to the body at positions about the opening of the body, the anchors being attached to the body and being proximate sides of the slideout unit when the slideout unit is in the extended position.

* * * * *